(12) United States Patent
Yang et al.

(10) Patent No.: US 10,727,018 B2
(45) Date of Patent: Jul. 28, 2020

(54) CIRCUIT INTERRUPTER WITH AUDIBLE INDICATION AND METHOD OF OPERATING A CIRCUIT INTERRUPTER

(71) Applicant: EATON CORPORATION, Cleveland, OH (US)

(72) Inventors: Lin Yang, Shanghai (CN); Tom Xiong, Shanghai (CN); Haidong Zhang, Shanghai (CN); Martin Chen, Shanghai (CN); Lili Du, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 317 days.

(21) Appl. No.: 15/822,451

(22) Filed: Nov. 27, 2017

(65) Prior Publication Data

US 2019/0164712 A1    May 30, 2019

(51) Int. Cl.
| | |
|---|---|
| *H01H 9/54* | (2006.01) |
| *H01H 71/04* | (2006.01) |
| *H01H 71/24* | (2006.01) |
| *H01H 83/02* | (2006.01) |
| *H01H 83/20* | (2006.01) |
| *H02H 3/04* | (2006.01) |
| *H02H 3/07* | (2006.01) |
| *H02H 3/00* | (2006.01) |
| *G08B 21/18* | (2006.01) |

(52) U.S. Cl.
CPC ............ *H01H 71/04* (2013.01); *H01H 9/54* (2013.01); *H01H 71/24* (2013.01); *G08B 21/185* (2013.01); *H01H 83/02* (2013.01); *H01H 83/20* (2013.01); *H01H 2219/036* (2013.01); *H02H 3/00* (2013.01); *H02H 3/04* (2013.01); *H02H 3/07* (2013.01)

(58) Field of Classification Search
USPC ...................................... 361/42–50
See application file for complete search history.

(56) References Cited

U.S. PATENT DOCUMENTS

| | | | | |
|---|---|---|---|---|
| 3,727,123 | A  * | 4/1973 | Smith ................. | G01R 31/343 322/99 |
| 5,546,266 | A  * | 8/1996 | Mackenzie ............ | H01H 73/14 340/638 |
| 2014/0098446 | A1* | 4/2014 | Aromin .................... | H02H 3/16 361/42 |
| 2017/0125996 | A1* | 5/2017 | Batko ....................... | H02H 3/04 |
| 2017/0243462 | A1* | 8/2017 | Gouhl ...................... | H02H 3/33 |
| 2018/0115146 | A1* | 4/2018 | Murahari ............. | H02H 1/0015 |

* cited by examiner

*Primary Examiner* — Danny Nguyen
(74) *Attorney, Agent, or Firm* — Eckert Seamans Cherin & Mellott, LLC

(57) ABSTRACT

A circuit interrupter including a line conductor, a neutral conductor, separable contacts structured to open to interrupt current flowing through the line and neutral conductors, a circuit interrupter circuit structured to detect a fault based on current flowing through the line and neutral conductors and to output a trip signal in response to detecting the fault, a trip circuit structured to trip open the separable contacts in response to the trip signal, and an audible indicator circuit electrically connected between the line and neutral conductors and being structured to output an audible sound in response to the trip circuit tripping open the separable contacts.

16 Claims, 2 Drawing Sheets

CIRCUIT INTERRUPTER WITH AUDIBLE INDICATION AND METHOD OF OPERATING A CIRCUIT INTERRUPTER

BACKGROUND

Field

The disclosed concept relates generally to circuit interrupters, and in particular, to circuit interrupters with an audible indicator. The disclosed concept is also related to methods of operating circuit interrupters.

Background Information

Circuit interrupters are typically used to protect electrical circuitry from damage due to a fault condition such as an arc fault or a ground fault. Circuit interrupters typically include separable contacts. The separable contacts are operated automatically in response to a detected fault condition. One type of a circuit interrupter is a ground fault circuit interrupter (GFCI).

GFCI's are often embodied as receptacles. In the case that a GFCI detects a ground fault and trips, the GFCI will no longer provide power to any connected devices. An existing GFCI is structured to detect a ground fault on a protected circuit and trip open its separable contacts in response to the detected ground fault. The GFCI includes a light emitting diode (LED) that lights up when the separable contacts are tripped. However, a user may not normally be looking at the GFCI, and thus may not notice that the LED is lit. Additionally, a user is not able to determine whether the ELD or the circuitry controlling it is operating properly.

There is therefore room for improvement in circuit interrupters.

There is also room for improvement in operating circuit interrupters.

SUMMARY

These needs and others are met by embodiments of the disclosed concept in which a circuit interrupter includes an audible indicator circuit structured to output an audible sound in response to a trip circuit tripping open separable contacts.

In accordance with aspects of the disclosed concept, a circuit interrupter comprises: a line conductor; a neutral conductor; separable contacts structured to open to interrupt current flowing through the line and neutral conductors; a circuit interrupter circuit structured to detect a fault based on current flowing through the line and neutral conductors and to output a trip signal in response to detecting the fault; a trip circuit structured to trip open the separable contacts in response to the trip signal; and an audible indicator circuit electrically connected between the line and neutral conductors and being structured to output an audible sound in response to the trip circuit tripping open the separable contacts.

In accordance with other aspects of the disclosed concept, a method of operating a circuit interrupter comprises: providing a circuit interrupter including a line conductor, a neutral conductor, separable contacts structured to open to interrupt current flowing through the line and neutral conductors, a circuit interrupter circuit structured to detect a fault based on current flowing through the line and neutral conductors and to output a trip signal in response to detecting the fault, a trip circuit structured to trip open the separable contacts in response to the trip signal, and an audible indicator; detecting a fault with the circuit interrupter circuit; tripping open the separable contacts with the trip circuit in response to detecting the fault; and activating the audible indicator to output an audible sound in response to tripping open the separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
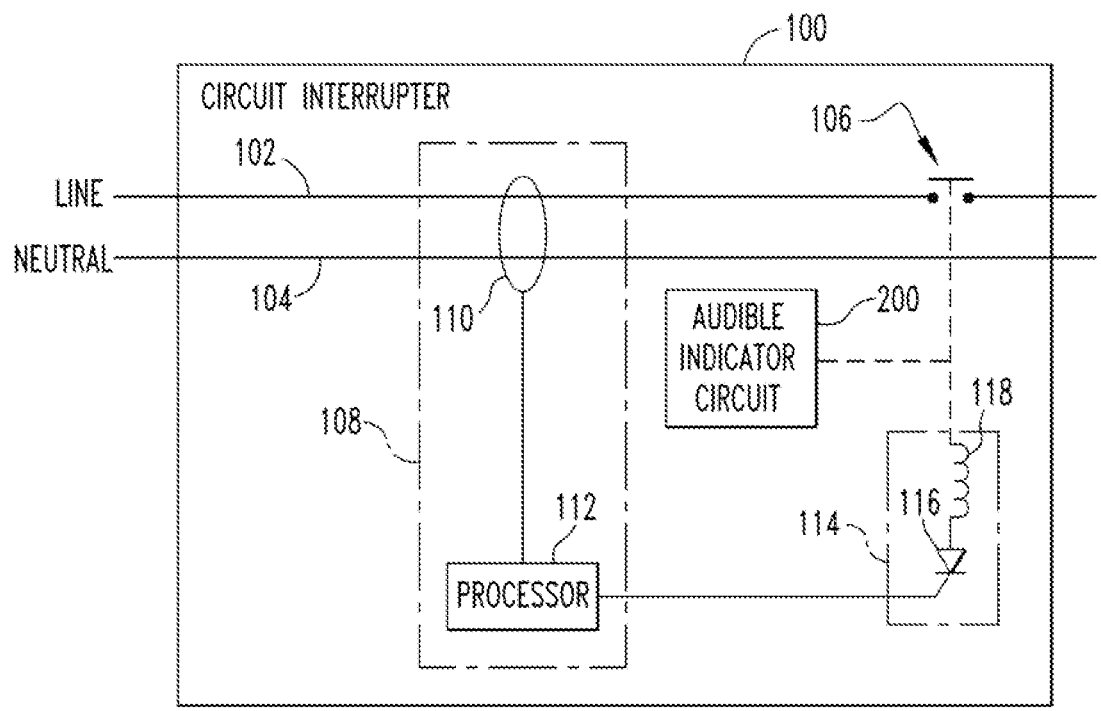
FIG. 1 is a schematic diagram of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 is a schematic diagram of a ground fault circuit interrupter (GFCI) 100 in accordance with an example embodiment of the disclosed concept. The GFCI 100 includes lines and neutral conductors 102,104 that pass through. The GFCI 100 also includes separable contacts 106. The line and neutral conductors 102,104 receive power from a power source (not shown) and provide it to a load (not shown). Opening the separable contacts 106 interrupter the current flowing through the line and neutral conductors 102,104 such that they stop providing power to the load.

The GFCI 100 further includes a GFCI circuit 108. The GFCI circuit 108 is structured to detect a ground fault based on the current flowing through the line and neutral conductors 102,104. In some example embodiments, the GFCI circuit 108 includes a ground fault current sensor 110 and a processor 112. The ground fault current sensor 110 is structured to sense a difference in current flowing through the line and neutral conductors 102,104. A difference in current flowing through the line and neutral conductors 102,104 can indicate that a ground fault is present. The processor 112 is structured to determine whether a ground fault is present based on the output of the ground fault current sensor 110. In response to detecting a ground fault, the processor 112 may output a trip signal which causes the separable contacts 106 to trip open. It will be appreciated by those having ordinary skill in the art that the GFCI circuit 108 may include other types of sensors and detect other types of faults without departing from the scope of the disclosed concept.

The processor 112 may include an associated memory. The memory may be included in the processor 112 or as a separate component. The processor 112 may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may also store one or more routines that the processor 112 is structured to execute to implement its functions.

The GFCI 100 further includes a trip circuit 114. The trip circuit 114 is structured to receive the trip signal from the GFCI circuit 100 and, in response, to trip open the separable contacts 106. In the example embodiment of the disclosed concept shown in FIG. 1, the trip circuit 114 includes a silicon controlled rectifier (SCR) 116 and a solenoid 118. The SCR 116 and is electrically connected in series with a coil of the solenoid 118. The SCR 116 is structured to receive the trip signal at its gate. In response to receiving the trip signal, the SCR 116 closes and allows current to flow through the coil of the solenoid 118. The solenoid 118 is operatively connected to the separable contacts 106 such that the solenoid 118 causes the separable contacts 106 to trip open when current flows through its coil. Although one example of a trip circuit 114 is shown in FIG. 1, it will be appreciated by those having ordinary skill in the art that other suitable types of trip circuits may be employed without departing from the scope of the disclosed concept.

The GFCI 100 further includes an audible indicator circuit 200. The audible indicator circuit 200 is electrically connected between the line and neutral conductors 102,104 and is structured to output an audible sound in response to the trip circuit 114 tripping open the separable contacts 106. In some example embodiments, the audible indicator circuit 200 is structured to output the audible sound when the separable contacts 106 are tripped open and is structured to not output the audible sound when the separable contacts 106 are not tripped open. In some example embodiments, the audible indicator circuit 106 is structured to output a visual indication. For example, the audible indicator circuit 106 may output the visual indication both when the separable contacts 106 are tripped open and when they are not tripped open.

Figure 2:
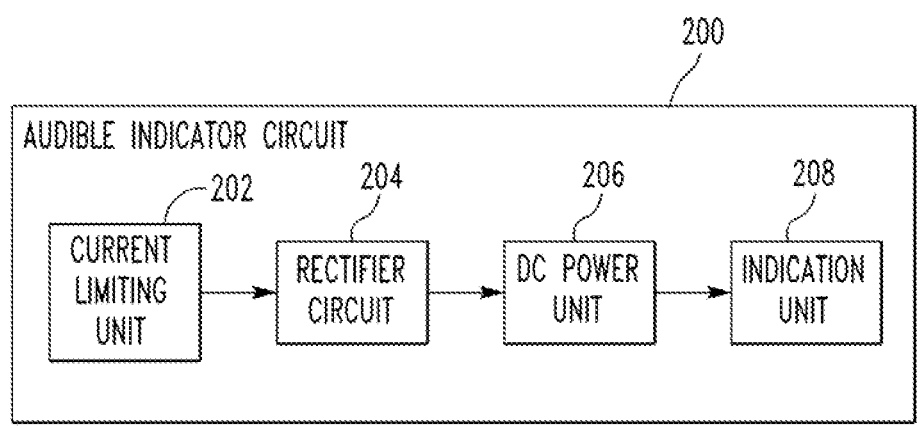
FIG. 2 is a schematic diagram of an audible indicator circuit in accordance with an example embodiment of the disclosed concept.
Figure 3:
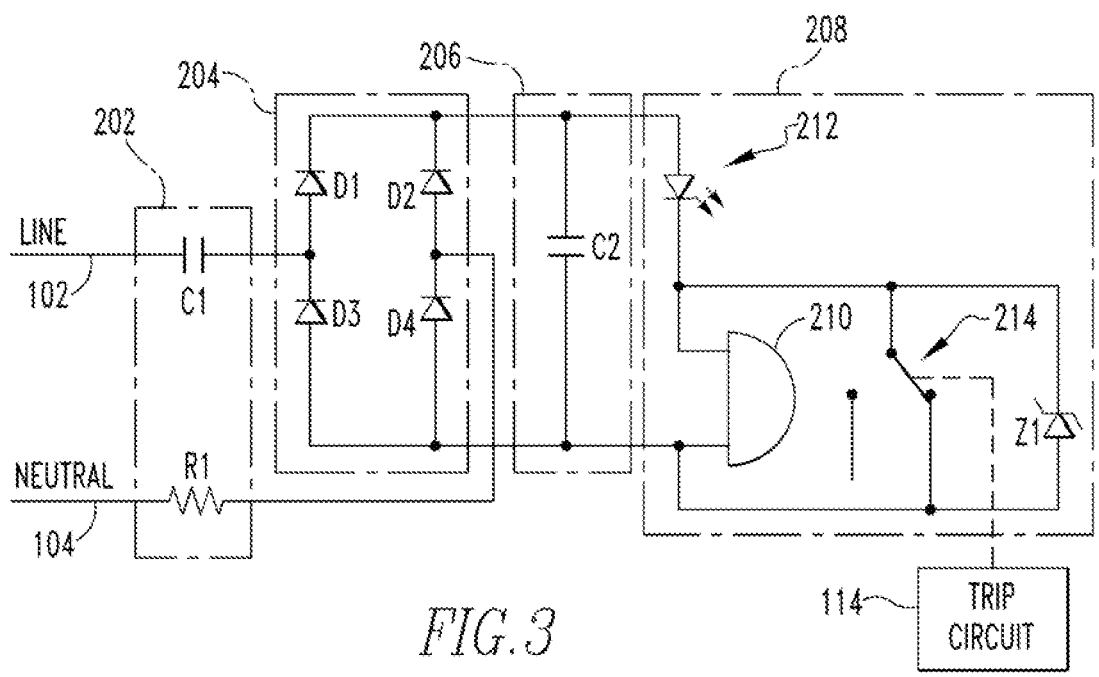
FIG. 3 is a circuit diagram of the audible indicator circuit of FIG. 2.

FIG. 2 is a schematic diagram of the audible indicator circuit 200 in accordance with an example embodiment of the disclosed concept and FIG. 3 is a circuit diagram of the audible indicator circuit 200 in accordance with an example embodiment of the disclosed concept. The audible indicator circuit 200 includes a current limiting unit 202, a rectifier circuit 204, a DC power unit 206, and an indication unit 208.

The current limiting unit 202 is electrically connected to the line and neutral conductors 102,104 and is structured to limit the current input to the audible indicator circuit 200. In some example embodiments of the disclosed concept, the current limiting unit includes a capacitor C1 and a resistor R1. The capacitor C1 is electrically connected to the line conductor 102 before the rectifier circuit 204. The resistor R1 is electrically connected to the neutral conductor 104 before the rectifier circuit 204. The capacitor C1 and the resistor R1 limit the current that is provided to the remainder of the audible indicator circuit 200. Additionally, the current provided from the line and neutral conductors 102,104 could cause components of the audible indicator circuit 200 to heat up and possibly become damaged if the current were not limited. The capacitor C1 is not as susceptible to heating up due to current in it as other types of components so it works well as a component to limit the current to the audible indicator circuit 200.

The rectifier circuit 204 is coupled to the line and neutral conductors 102,104 via the current limiting unit 202. The rectifier circuit 204 receives power output from the current limiting unit 202. The power output from the current limiting unit 202 is AC power whose current is limited by the current limiting unit 202. The rectifier circuit 204 is structured to rectifier the power it receives. In some example embodiments of the disclosed concept, the rectifier circuit 204 is arranged as a full-wave rectifier such as, for example and without limitation, a full-wave bridge rectifier. However, it will be appreciated by those having ordinary skill in the art that other types of rectifiers may be employed without departing from the scope of the disclosed concept. FIG. 3 shows an example embodiment of the disclosed concept where the rectifier circuit 204 includes four diodes D1,D2, D3,D4 arranged as a full-wave rectifier.

The output of the rectifier circuit 204 is rectified AC power. The output of the rectifier circuit 204 is electrically connected to the DC power unit 206. The DC power unit 206 is structured to covert the output of the rectifier circuit 204 to DC power. In some example embodiments of the disclosed concept, the DC power unit 206 includes a capacitor C2 to smooth the output of the rectifier circuit 204 to convert it into DC power.

The output of the DC power unit 206, DC power, is provided to the indication unit 208. The indication unit 208 is structured to output the audible sound when the separable contacts 106 are tripped open and to not output the audible sound when the separable contacts 106 are not tripped open. The indication unit 208 is also structured to output the visual indication both when the separable contacts 106 are tripped open and when the separable contacts 106 are not tripped open.

FIG. 3 illustrates an audible indication unit 208 in accordance with an example embodiment of the disclosed concept. The audible indication unit 208 includes an audible indicator 210, a visual indicator 212, a switch 214, and a zener diode Z1. The audible indicator 210, the switch 214, and the zener diode Z1 are electrically connected in parallel with each other. The visual indicator 212 is electrically connected in series with the parallel combination of the audible indicator 210, the switch 214, and the zener diode Z1.

The switch 214 has an open state and a closed state. In the closed state (shown in FIG. 3), current flows through the visual indicator 212 and through the switch 214, bypassing the audible indicator 210. When the switch 214 is in the closed state, the visual indicator 212 is activated (e.g., lit up) and the audible indicator 210 is not activated (e.g., does not output an audible sound). When the switch 214 is in the open state, current flows through the visual indicator 212 and the audible indicator 210. The zener diode Z1 limits that amount of voltage across the audible indicator 210. When the switch 214 is in the open state, the visual indicator 212 and the audible indicator 210 are both activated such that the audible indicator circuit 200 provides both an audible and visual indication.

In some example embodiments of the disclosed concept, the switch 214 is operated in response to the trip circuit 114 opening the separable contacts 106. For example and without limitation, the trip circuit 114 may be operatively connected to the switch 214 such that when the trip circuit 114 causes the separable contacts 106 to open, the trip circuit 114 also causes the switch 214 to open. For example and without limitation, the switch 214 may be a physical switch that is opened by an operating mechanism in response to actuation of the solenoid 118 of the trip circuit 114. However, it will be appreciated by those having ordinary skill in the art that other mechanism may be employed to operate the switch 214 in response to the trip circuit 114 opening the separable contacts 106. For example and without limitation, in some exemplary embodiments of the disclosed concept the switch 214 may be an electrically controlled switch such as, without limitation, an electrically controlled relay that is controlled to open and close in response to an electrical signal. For example and without limitation, the processor 112 may be structured to output an electrical signal to the switch 214 to open the switch 214 concurrently with outputting the trip signal to cause the trip circuit 114 to open the separable contacts 106.

In some example embodiments of the disclosed concept, the switch 214 is normally in the closed state and the separable contacts 106 are in their closed state. In this state, the visual indicator 212 is activated and the audible indicator 210 is not activated. As described above, the switch 214 is opened in response to the trip circuit 114 opening the separable contacts 106. Thus, the switch 214 is open concurrently with the separable contacts 106 being open. When the switch 214 is open, both the audible indicator 210 and the visual indicator 212 are activated. A user can recognize from the audible sound output from the audible indicator 210 that a fault has occurred and the separable contacts 106 have been tripped open. With the visual indicator 212 being activated regardless of whether the separable contacts 106 have been opened or not, a user can verify the integrity of the audible indicator circuit 200 by verifying that the visual indicator 212 is activated. The visual indicator 212 not being activated can be indicative of a problem with the audible indicator circuit 200.

The audible indicator 210 may be any suitable component capable of outputting an audible sound. For example and without limitation, the audible indicator 210 may be a speaker, buzzer, or other component capable of outputting an audible sound in response to current being passed through it. The visual indicator 212 may be any suitable component capable of outputting a visual indication. For example and without limitation, the visual indicator 212 may be a light emitting diode (LED) or any other suitable component that outputs a visual indication in response to current passing through it. As used herein activating the audible indicator 210 refers to causing the audible indicator 210 to output the audible sound and activating the visual indicator 212 refers to causing the visual indicator to output the visual indication.

Figure 4:
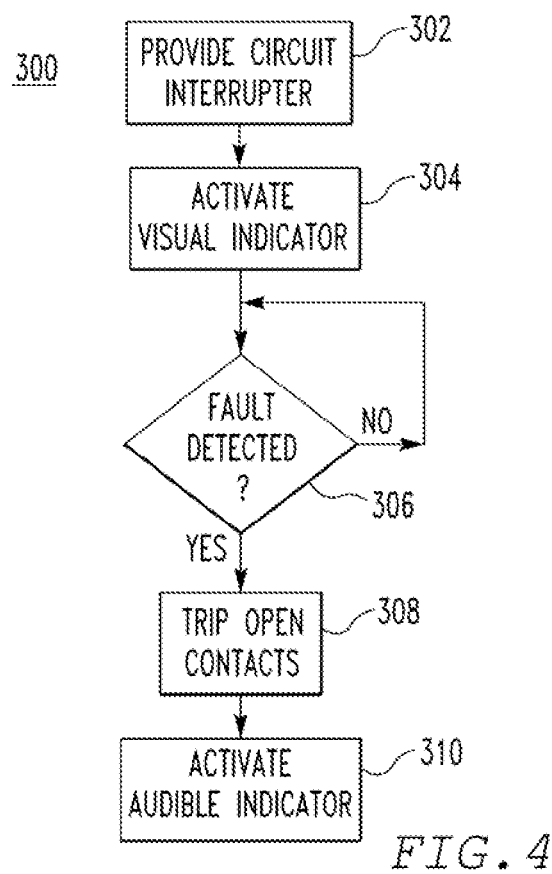
FIG. 4 is a flowchart of a method of operating a circuit interrupter in accordance with an example embodiment of the disclosed concept.

FIG. 4 is a flowchart of a method 300 of operating a circuit interrupter in accordance with an example embodiment of the disclosed concept. The method begins at 302 with providing a circuit interrupter. The provided circuit interrupter may be, for example and without limitation, the GFCI 200 shown in FIG. 1. In some example embodiments of the disclosed concept, providing the circuit interrupter includes providing a circuit interrupter including a line conductor 102, a neutral conductor 104, separable contacts 106 structured to open to interrupt current flowing through the line and neutral conductors 102,104, a circuit interrupter circuit 108 structured to detect a fault based on current flowing through the line and neutral conductors 102,104 and to output a trip signal in response to detecting the fault, a trip circuit 114 structured to trip open the separable contacts in response to the trip signal, and an audible indicator 210. In some example embodiments of the disclosed concept, a visual indicator 212 and/or a switch 214 may also be provided.

At 304, the visual indicator 212 is activated. The visual indicator 212 may be activated regardless of whether the separable contacts 106 have been tripped open. At 306, the circuit interrupter circuit 108 detects the fault. When the fault is detected, the method proceeds to 308 where the trip circuit 114 trips open the separable contacts 106. The method then proceeds to 310 where the audible indicator 210 is activated in response to the trip circuit 114 tripping open the separable contacts 108.

In some example embodiments of the disclosed concept, the switch 214 is provided in parallel with the audible indicator 210 and in series with the visual indicator 212. The switch 214 may be opened when the separable contacts 106 are tripped open and closed when the separable contacts 106 are not tripped open.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
a line conductor;
a neutral conductor;
separable contacts structured to open to interrupt current flowing through the line and neutral conductors;
a circuit interrupter circuit structured to detect a fault based on current flowing through the line and neutral conductors and to output a trip signal in response to detecting the fault;
a trip circuit structured to trip open the separable contacts in response to the trip signal; and
an audible indicator circuit electrically connected between the line and neutral conductors and being structured to output an audible sound in response to the trip circuit tripping open the separable contacts,
wherein the audible indicator circuit includes an audible indicator structured to output the audible sound when activated and a visual indicator structured to output a visual indication when activated,
wherein the audible indicator circuit is structured to output the audible sound when the separable contacts are tripped open and to not output the audible sound when the separable contacts are not tripped open; and
wherein the audible indicator circuit is structured to output the visual indication both when the separable contacts are tripped open and when the separable contacts are not tripped open.

2. The circuit interrupter of claim 1, wherein the audible indicator includes a switch electrically connected in parallel with the audible indicator and in series with the visual indicator; and wherein the switch is structured to open when the separable contacts are tripped open and to close when the separable contacts are not tripped open.

3. The circuit interrupter of claim 2, wherein the audible indicator circuit is structured such that current flows through the visual indicator to activate the visual indicator and bypasses the audible indicator by flowing through the switch when the switch is closed.

4. The circuit interrupter of claim 2, wherein the audible indicator circuit is structured such that current flows through the visual indicator to activate the visual indicator and through the audible indicator to activate the audible indicator when the switch is open.

5. The circuit interrupter of claim 4, wherein the audible indicator circuit further includes a zener diode electrically connected in parallel with the switch and the audible indicator; and wherein the zener diode is structured to limit a voltage across the audible indicator.

6. The circuit interrupter of claim 2, wherein the trip circuit includes a silicon controlled rectifier (SCR) and a solenoid; wherein the SCR is structured to activate and cause the solenoid to actuate in response to the trip signal; and wherein actuation of the solenoid causes the separable contacts and the switch to open.

7. The circuit interrupter of claim 2, wherein the switch is an electrically controlled switch; and wherein the switch is structured to open in response to the trip signal.

8. The circuit interrupter of claim 1, wherein the visual indicator is a light emitting diode.

9. The circuit interrupter of claim 1, wherein the audible indicator circuit includes a current limiting unit structured to limit input current to the audible indicator circuit.

10. The circuit interrupter of claim 9, wherein the current limiting unit includes a capacitor electrically connected to the line conductor and a resistor electrically connected to the neutral conductor.

11. The circuit interrupter of claim 1, wherein the audible indicator circuit includes a rectifier circuit structured to rectify power received from the line and neutral conductors.

12. The circuit interrupter of claim 11, wherein the rectifier circuit includes a full-wave rectifier.

13. The circuit interrupter of claim 11, wherein the audible indicator circuit includes a capacitor electrically connected to an output of the rectifier circuit and being structured to smooth power output from the rectifier circuit.

14. The circuit interrupter of claim 1, wherein the fault is a ground fault.

15. A method of operating a circuit interrupter, the method comprising:
providing a circuit interrupter including a line conductor, a neutral conductor, separable contacts structured to open to interrupt current flowing through the line and neutral conductors, a circuit interrupter circuit structured to detect a fault based on current flowing through the line and neutral conductors and to output a trip signal in response to detecting the fault, a trip circuit structured to trip open the separable contacts in response to the trip signal, and an audible indicator;
detecting a fault with the circuit interrupter circuit;
tripping open the separable contacts with the trip circuit in response to detecting the fault; and
activating the audible indicator to output an audible sound in response to tripping open the separable contacts;
providing a visual indicator; and
activating the visual indicator to output a visual indication regardless of whether the separable contacts are open or closed.

16. The method of claim 15, further comprising:
providing a switch electrically connected in series with the visual indicator and electrically connected in parallel with the audible indicator;
opening the switch when the separable contacts are tripped open; and
closing the switch when the separable contacts are not tripped open.

\* \* \* \* \*